Nov. 7, 1944.  J. F. MAHLSTEDT  2,362,285
AUTOMATIC DRAFT REGULATOR FOR ORCHARD HEATERS
Filed Nov. 19, 1940  2 Sheets-Sheet 1
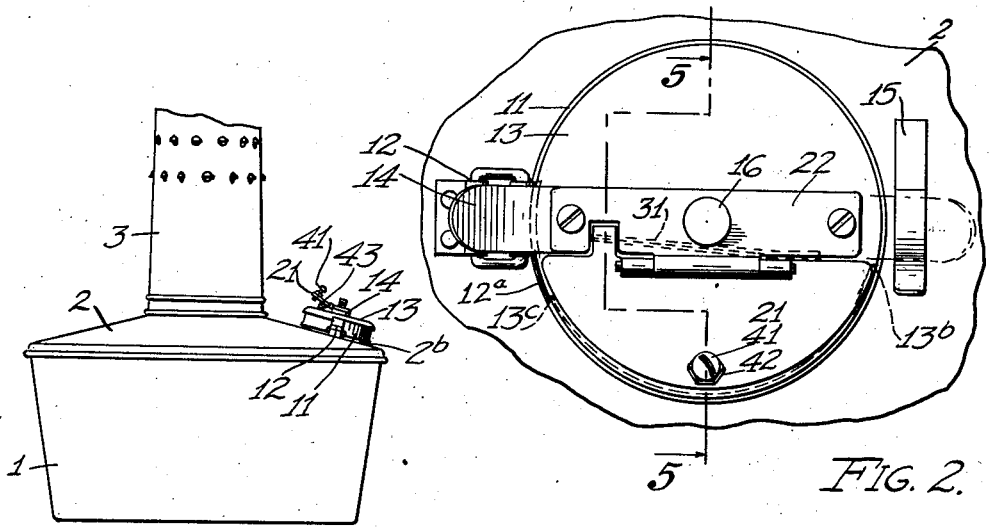
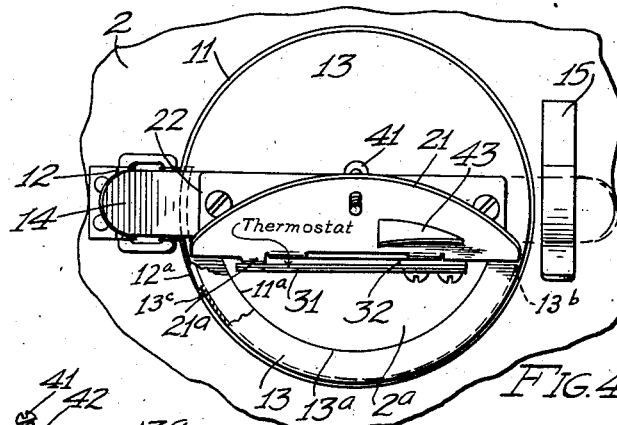
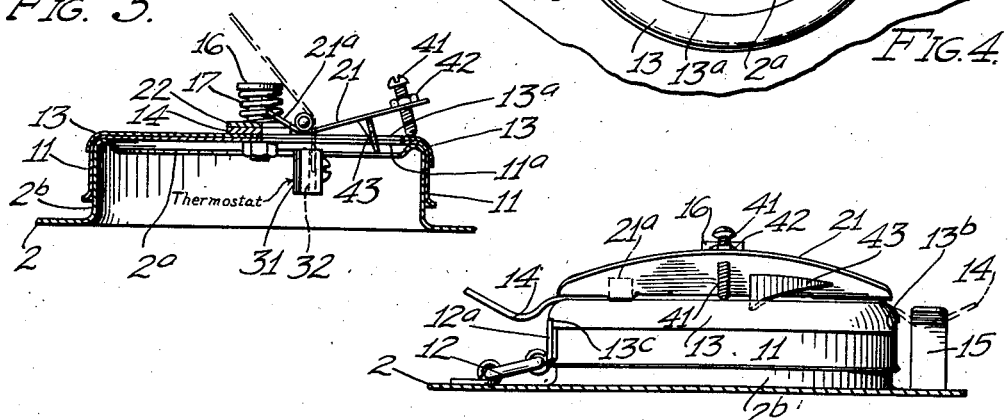
INVENTOR.
J. F. MAHLSTEDT.
BY
ATTORNEY Nov. 7, 1944.   J. F. MAHLSTEDT   2,362,285
AUTOMATIC DRAFT REGULATOR FOR ORCHARD HEATERS
Filed Nov. 19, 1940   2 Sheets-Sheet 2
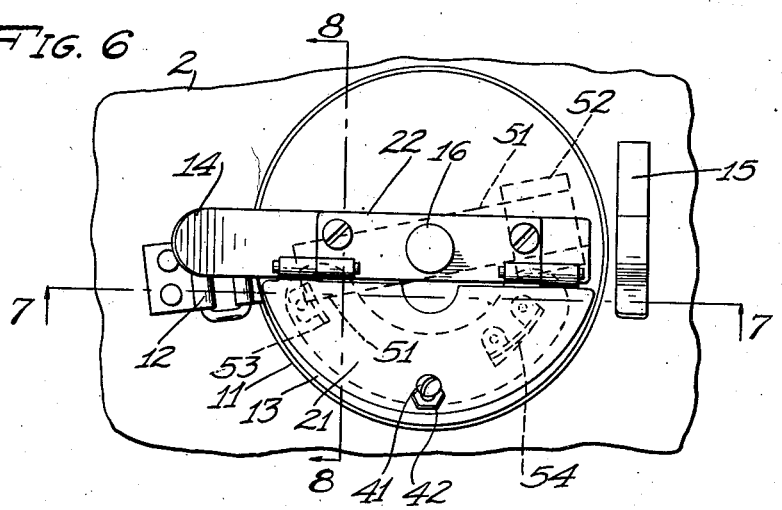
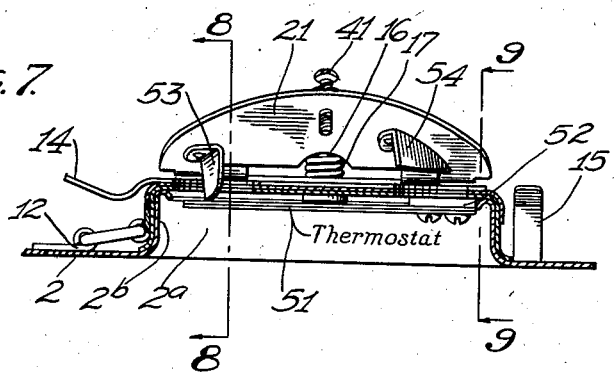
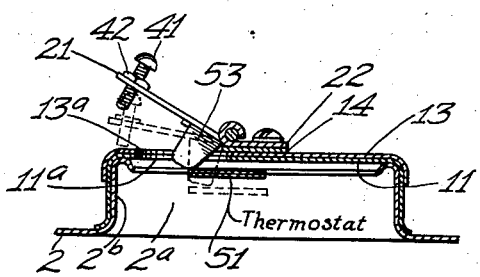
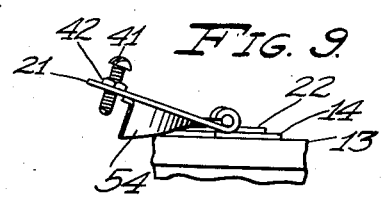
INVENTOR.
J. F. MAHLSTEDT
BY
William C. Hall
ATTORNEY.

Patented Nov. 7, 1944

2,362,285

UNITED STATES PATENT OFFICE 2,362,285

AUTOMATIC DRAFT REGULATOR FOR ORCHARD HEATERS

John Frederick Mahlstedt, Los Angeles, Calif., assignor to Scheu Products Company, Ltd., Upland, Calif., a corporation of California Application November 19, 1940, Serial No. 366,227

3 Claims. (Cl. 158—91)

My present invention relates to an automatic draft regulating means for orchard heaters.

One of the principal objects of this invention is to provide an automatic draft regulating means of this class which is particularly simple and economical of construction, one which is easy to adjust and operate, and one which is foolproof in its operation and which will not readily deteriorate.

Another important object of this invention is to provide a draft regulator of this class which may be readily installed on orchard heaters now in use, and specifically on the filling opening caps or the manual draft regulating caps now in use thereon.

An important object also of this invention is to provide an automatic draft regulating means of this class in which the draft opening is closed by a thermostat and in which the force, for closing the draft opening, to which thermostat is subjected, is reduced to a minimum, thereby decreasing a normal tendency of distorting the thermostat when constantly subjected to heat and resistance.

A further important object of this invention is to provide a draft regulator which is automatically adjusted to a predetermined closed position, but which may be subsequently manually adjusted by substantially the same means.

Still another important object of this invention is to provide simple cam means for manually regulating the draft opening.

A still further important object of this invention is to provide a draft regulator on an orchard heater and which is arranged for automatic draft regulation on or in connection with the fuel filling opening thereof.

With these and other objects in view, as will appear hereinafter, I have devised an automatic draft regulator for orchard heaters, which consists of certain novel features of construction, combination, and arrangement of parts and portions, as will be hereinafter described in detail and particularly set forth in the appended claims, reference being had to the accompanying drawings and to the characters of reference thereon, which form a part of this application, in which:

Fig. 1 is a fragmentary side elevation of an orchard heater showing my draft regulating means thereon;

Fig. 2 is an enlarged fragmentary plan view of the draft regulating means on the orchard heater, showing the draft regulating means closed;

Fig. 3 is a fragmentary front elevation thereof, with the draft regulating means closed;

Fig. 4 is an enlarged fragmentary view in plan of my draft regulating means in an open position;

Fig. 5 is a sectional view thereof, taken through 5—5 of Fig. 2;

Fig. 6 is a fragmentary plan view, similar to Fig. 2 of a modified form;

Fig. 7 is a fragmentary section thereof, taken through 7—7 of Fig. 6;

Fig. 8 is a fragmentary sectional elevation, taken through 8—8 of Fig. 7, showing the relation of the shutter to the draft regulating thermostat; and, Fig. 9 is a fragmentary sectional elevation, taken through 9—9 of Fig. 7, showing the manual means for regulating the draft.

The draft regulator or regulating means of my invention is shown on or in connection with a conventional type orchard heater. The heater shown consists of a fuel receptacle 1, a cover 2 for covering substantially the whole of the upper part of the receptacle, and a stack 3 which rises centrally above the cover.

The cover in the conventional orchard heater, as shown in the drawings, is provided with a draft and filling opening $2^a$ which is surrounded by an annular flange or neck $2^b$.

Over the filling opening of the cover of the conventional orchard heater is provided an inverted dish-shaped cap 11. This cap is hinged at one side to the cover at one side of the filling opening by means of a linked hinge 12. The cap is provided with one or more vent openings $11^a$.

At the upper side of the cap is a circular shutter 13 which is usually co-axial with the cap and is axially rotatable relative thereto. The shutter is provided with an arcuate opening $13^a$ which is adapted variously to register with the openings $11^a$ in the cap for manually regulating the amount of air which is to pass through the cap into the receptacle 1. When the opening $13^a$ is out of registry with the opening $11^a$, air is excluded from the receptacle. The full open and closed positions are determined by suitable stops. These stops may be shoulders $13^b$ and $13^c$ on the shutter 13 which may engage the opposite edges of the plate $12^a$ of the hinge 12, as shown in Figs. 3 and 2.

To the upper side of the shutter 13 is secured a strap 14 which forms a handle for rotating the shutter with respect to the cap. One end of the strap extends beyond the shutter and is adapted to be forced under a catch or keeper 15, provided on the cover at the side of the draft opening $2^a$ diametrically opposed from the hinged portion of the cap. Thus the handle 15 facilitates the rotation of the shutter as well as holds the cap in a closed position over the draft opening when the shutter is closed with respect to the draft openings of the cap.

The arcuate opening 13ª of the shutter is located preferably at the lower side of the strap or handle 14. My present invention contemplates closing or partially closing this vent opening. This is effected by a draft regulating plate 21 of segmental shape, the straight portion of the plate 21 being pivoted along one side of the strap or handle 14. The plate may be directly pivoted on this handle, or it may be pivoted at one edge of the hinge plate 22, as shown in the drawings, this plate 22 being secured to the shutter, preferably above or to the upper side of the handle 14. The shutter 13 is preferably frictionally connected with the axial portion of the cap 11 by means of a pivot bolt 16 and a spring 17, the latter being positioned around the bolt above the shutter. This bolt 16 extends preferably through the plate 22 and the spring 17 is preferably located above the hinge plate 22.

At the inner or under side of the cap is a bi-metal thermostat 31 which is supported at one end on a bracket 32 secured to the under side of the cap 11 in such a manner that the free end of the thermostat extends towards the side of the cap at which the free end of the handle 14 is located. The draft regulating plate 21 has a lug 21ª which extends to the opposite side of the pivotal axis from the main portion of the plate 21, and is bent slightly downwardly from the plate of the main portion of the plate 21. When the plate 21 is in a closed position, as shown by solid lines in Fig. 5 of the drawings, the lug 21ª engages the inner side of the free end of the thermostat, the shutter 13, handle 14, and the plate 22 being provided with suitable openings to allow the lug 21ª to project from the upper to the lower side of these members.

When the thermostat is subjected to heat, as when the heater is lighted and burning properly, the thermostat 31 is distorted, as shown in dotted lines in Fig. 2, forcing the lug backwardly and the plate 21 about its pivotal axis until the plate is over-balanced and falls by gravity to a closed position over the aforementioned draft opening.

Near the free edge of the plate 21 is a regulating member 41, which in this instance is a screw which may be locked in its adjusted position by a lock nut 42. The one or free end of the adjusting screw extends beyond the underside of the plate 21 and is adapted to engage the top side of the shutter 13 for limiting the closed position of the draft regulating plate 21.

The provision of the automatic draft regulating means on the cap and shutter does not interfere with the manual control of the shutter with respect to the cap. To effect such manual adjustment, I have provided an inclined or spiral cam 43 at the normally underside of the plate 21. This cam is preferably located at the end opposite the lug 21ª. Slight counter-clockwise rotation of the shutter will cause the cam to engage the cap 11 adjacent the vent hole 11ª and cause the plate 21 to be raised as the shutter is rotated. It will be noted that before manual rotation or shifting of the shutter, the cam 43 extends freely downwardly into the vent openings 11ª and 13ª.

The shutter is rotated by means of the handle 14. If desired, the draft regulating plate 21 may be tilted backwardly out of the way to permit only the manual control for the draft, which is effected by closing the draft opening 11ª.

In the modified structure shown in Figs. 6 and 10, inclusive, the elements 11, 12, 13, 14, 15, 16, 17, 21, 22, 41, and 42 are substantially similarly constructed, arranged, and operated.

The thermostat 51 in this instance is also of the bi-metal type, but is arranged flatwise with respect to and at the underside of the cap 11. The thermostat 51 extends diametrically across the cap 11 and is secured at one end to a plate 52 which spaces the thermostat below the underside of the cap 11. The draft regulating plate 21, in this instance, has a downwardly extending lug 53, which lug is positioned at the same side from the pivotal axis of the draft regulating plate 21 as the main portion of the plate. In its normal position, that is, when the heater is cold or is about to be lighted, the end of the lug 53 rests upon the upper side of the free end of the thermostat and thereby holds the plate 21 in a maximum open position, as shown in Fig. 8.

When the heater is lighted and continues to burn, the thermostat is heated and is deflected downwardly by the heat, allowing the plate to assume a predetermined open position for normal burning of the heater, as shown by dotted lines in Fig. 8.

When desiring to open the draft regulating plate beyond its predetermined position, which is controlled by the screw 41, the shutter 13 is rotated counter-clockwise by means of the handle 14. When so rotated, an inclined cam 54, also provided at the underside of the draft regulating plate 21, engages one end of the draft opening 11ª and raises the plate 21 about its pivotal axis in proportion to the rotation of the shutter, as shown best in Fig. 9. It will be noted that the plate 21 is raised about its pivotal axis by the inclined cam 54 only beyond the normally open position determined by the screw 41.

It will be noted that the lug 53 is inclined at its inner edge, as indicated by 53ª. This inclined edge, when the shutter and the draft regulating plate thereon are rotated counter-clockwise, forces the lug 53 to rise and to mount the free end of the thermostat, that is, to assume its initial position.

Though I have shown and described a particular construction, combination, and arrangement of parts and portions, and certain modifications thereof, I do not wish to be limited to the same, but desire to include in the scope of my invention the construction, combination, and arrangement substantially as set forth in the appended claims.

I claim:

1. In a heater having a combustion chamber and a vent opening, a shutter rotatably mounted on the heater to cover and uncover the vent opening, a draft regulating plate hingedly mounted on a substantially horizontal axis on the shutter and disposed adjacent and adapted variously to cover said opening in a position to restrict the passage of air therethrough, means in connection with the plate for positively limiting the closed position of the plate over the opening, and a cam on the plate, said cam adapted variously to engage the heater adjacent the vent opening for determining the open position of the plate, above the position determined by said means, when the shutter is rotated to various positions.

2. In a heater having a combustion chamber and a vent opening, a shutter rotatably mounted on the heater to cover and uncover the vent opening, a draft regulating plate hingedly mounted on a substantially horizontal axis on the shutter and adapted normally to be held in an open position with respect to the shutter, and a cam on the shutter adapted variously to engage the heater adjacent the vent opening therein for holding the plate in various open positions dependent upon the rotated position of the shutter.

3. In association with a vaporizing type orchard heater provided with a vaporizing chamber, said heater having a cover over the vaporizing chamber and provided with an air-admitting opening for maintaining a vaporizing flame within said heater, a cap on the cover to close over the opening and provided with a vent, a shutter axially mounted on the cap and provided with a registering vent, a draft regulating plate pivoted on a substantially horizontal axis on the shutter and adapted normally to be held in an open position, and a cam on the plate adapted variously to engage the cap adjacent the vent therein for holding the plate in various open positions dependent upon the rotated position of the shutter with respect to the cap.

JOHN FREDERICK MAHLSTEDT.